C. A. ROHLAND.
PROCESS OF MANUFACTURING VACUUM WALL CONTAINERS.
APPLICATION FILED MAR. 20, 1920.
1,388,126.
Patented Aug. 16, 1921.
3 SHEETS—SHEET 3.
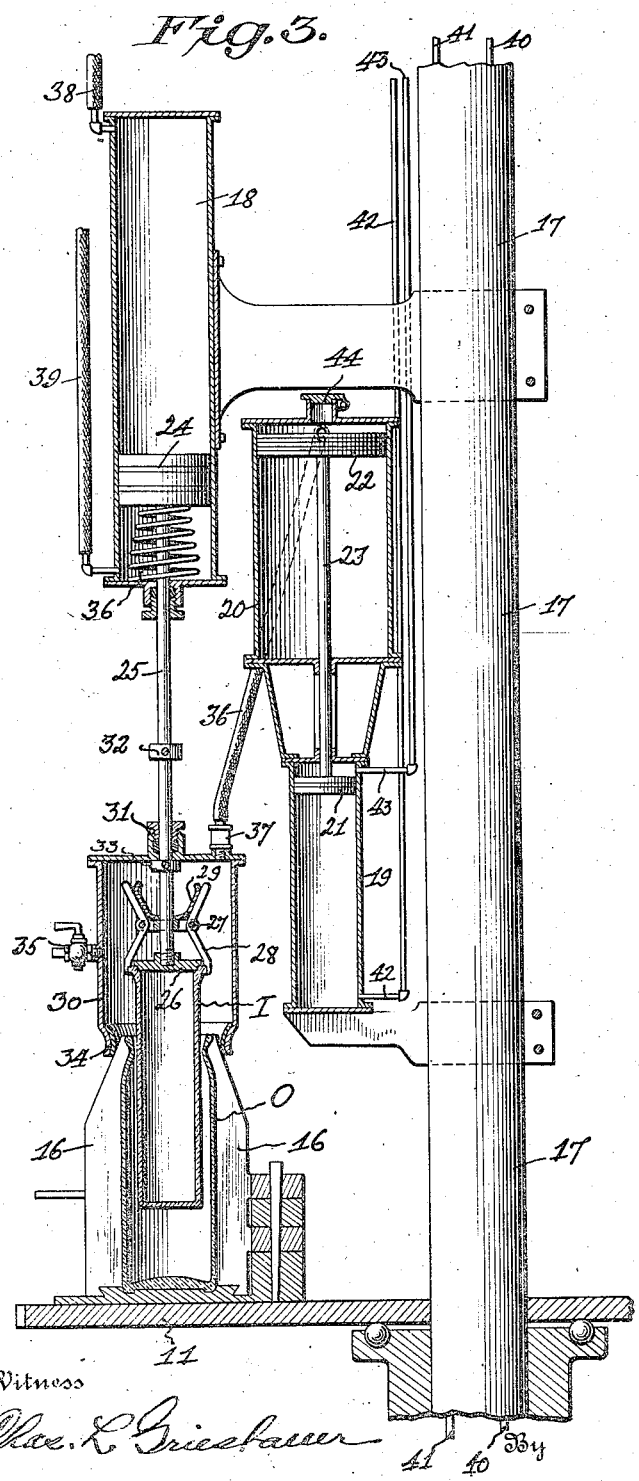
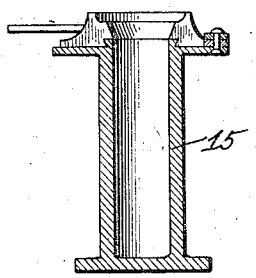
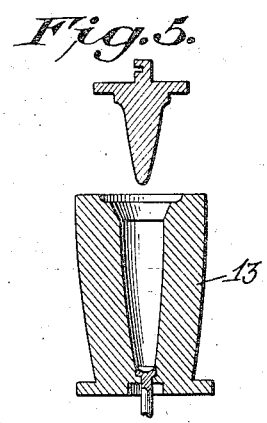
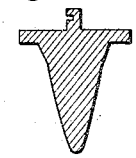
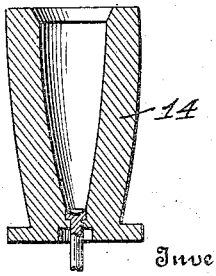
Inventor
Charles A. Rohland,
W. Schoraborn
Attorney
Witness
Chas. L. Griesbauer

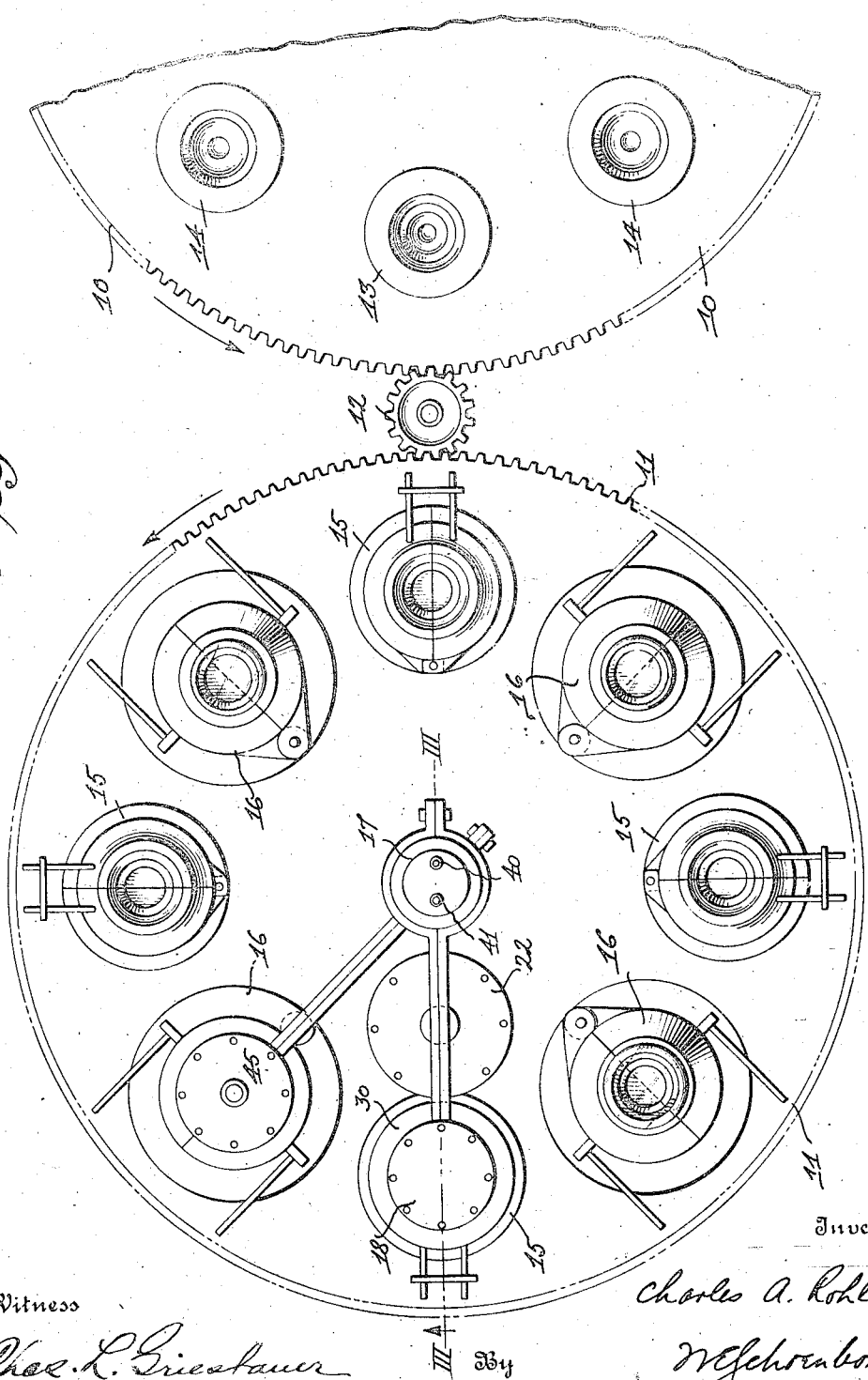

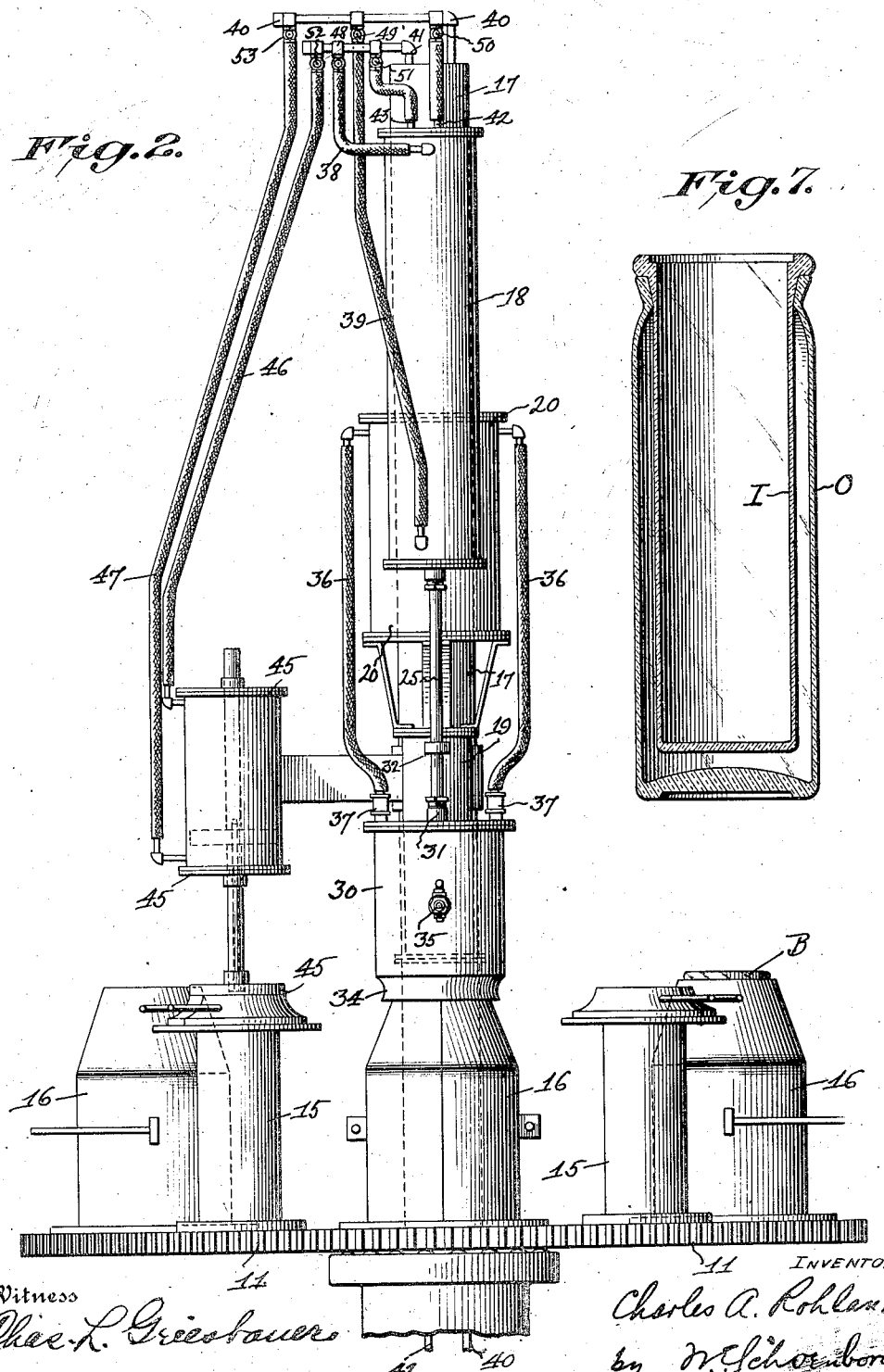

UNITED STATES PATENT OFFICE.

CHARLES A. ROHLAND, OF UNIONTOWN, PENNSYLVANIA, ASSIGNOR, BY DIRECT AND MESNE ASSIGNMENTS, TO VACUUM GLASS MACHINE COMPANY, OF UNIONTOWN, PENNSYLVANIA, A CORPORATION OF DELAWARE.

PROCESS OF MANUFACTURING VACUUM WALL-CONTAINERS.

1,388,126. Specification of Letters Patent. Patented Aug. 16, 1921.

Application filed March 20, 1920. Serial No. 367,472.

*To all whom it may concern:*

Be it known that I, CHARLES A. ROHLAND, a citizen of the United States, and a resident of Uniontown, in the county of Fayette and State of Pennsylvania, have invented certain new and useful Improvements in Processes of Manufacturing Vacuum Wall-Containers, of which the following is a specification.

This invention relates to a new process of manufacturing vacuum wall containers of any size, capacity, shape or design, and it has for its object to reduce the steps of operation and labor in manufacturing said containers at a minimum cost and in great quantities. A further object is to enable one to produce vacuum walled containers when made of glass to eliminate the use of quicksilver lining, so that the same will be transparent and enable any foreign matter in the container to be detached, and especially adapt the same for use as a cheap and highly efficient carrier for milk, cream or other liquid and perishable food products.

Other objects and advantages of the process will be manifest and fully understood from the detailed description of the steps of the process described in connection with an apparatus for carrying out the same to be hereinafter more fully disclosed.

The invention consists of steps, or a series of steps, in a certain sequence upon certain materials, such as molten glass or other material having similar characteristics to be hereinafter more fully described and particularly pointed out in the appended claims.

In the three sheets of drawings, similar reference characters indicate the same parts in the several figures in which,—

Figure 1, is a plan and fragmentary view of a machine for carrying out the improved process, with the pressure pipe connection removed, for clearness;

Fig. 2, is a side elevation and section of the machine shown in Fig. 1;

Fig. 3, is a cross-section taken on line III—III of Fig. 1, with the usual blow head removed;

Fig. 4, is a cross-section of the finishing mold for the inner section of the container;

Fig. 5, is a cross section of the mold and plunger for casting and pressing the blank for the inner section of the container;

Fig. 6, is a cross section of the mold and plunger for pressing the blank for the outer shell of the container, and Fig. 7, is an enlarged cross-section of a finished vacuum wall container made according to the process.

In the drawing, the machine shown is illustrated as an attachment to the usual form of glass blowing machines of standard make, and the changes made are readily adaptable to said machines by merely varying the mold and plunger equipments and modifying the motive power or compressed air connections for properly functioning the novel vacuum producing and sealing operations carried out during the improved process.

Referring to Fig. 1 of the drawings, 10 is the blank table and 11 is the blowing up table, said tables 10 and 11 being interengaged by pinion 12 meshing with teeth on the periphery of said tables 10 and 11, so that said tables will rotate in fixed relation and in opposite direction, as indicated by arrows. Table 10 is provided with two sets of blank molds, one set 13 being the smaller, as shown in Fig. 5, and forming the inner section I of the container (see Fig. 7) and the larger molds 14 (as shown in Fig. 6) for forming the outer shell O of the container, said molds 13 and 14 alternating around the table 10, as indicated.

Table 11 has secured to it and disposed as shown a series of blow molds 15, 15, as shown in Fig. 4, for finishing the inner sections of the container formed by the molds 13 on table 10. 16, 16, are a series of blow molds, as shown in Fig. 3 for finishing the outer shells formed by the molds 14, 14, on table 10, said blow molds 15 and 16 are alternately arranged as shown and so disposed that by the fixed relation and opposite rotation of the tables 10 and 11 the blank molds 13 and blow molds 15 are opposite at the nearest point of approach to each other, and by the opposite rotation of the said tables 10 and 11 the same relation between the molds 14 and 16 will follow, and while I may provide eight molds on each of the tables 10 and 11, this number may be decreased or increased without departing from the present invention, depending upon the size, capacity and configuration of the finished container.

Secured to the hollow central column 17 of the usual and standard form of glass blowing machine are provided three cylinders 18, 19 and 20, the two last mentioned cylinders 19 and 20, being preferably nearest to the column 17 and arranged in line with each other and are provided with pistons 21 and 22, which are connected together by a piston rod 23, as clearly shown in Fig. 3. Cylinder 18 is provided with a piston 24 having a piston rod 25, the lower end of which rod is secured to a disk 26, adapted to be seated in the open end of the inner section I, of the container, as shown in Fig. 3. A short distance above the said disk 26 is fastened a support 27 to which is suitably pivoted fingers 28, 28, so constructed and arranged to grip the outer and upper edge or ring of the inner section I, said fingers 28, 28, being normally forced toward the disk 26 by suitable springs 29, 29, as indicated. 30 is a suction head surrounding the lower end of the piston rod 25 and is provided with a stuffing box 31 at its upper end through which said rod 25 passes. On said rod 25 are adjustable stops 32, and 33, to limit the upper and lower movement or position of the suction head 30 on said rod 25 and said stop 33 is adapted to lift said head 30 in the upward movement of the end of rod 25, for purposes to be hereinafter explained. The lower edge 34 of the suction head 30 is so formed and constructed as to tightly fit and engage the tapered top of a closed blow mold 16 when properly placed or rotated in position with respect to the axis of the rod 25. 35 is a valve controlling an air inlet passage leading into the suction head 30 for the purpose of destroying the vacuum within said head after a container has been finished within the mold 16. 36 is a buffer spring interposed between the piston 24 and lower head of the cylinder 18 for retarding the downward movement of said piston 24, as will be readily understood. A pair of flexible tubes 36 connects the interior of the upper end of the suction cylinder 20 with the interior of the suction head 30 through check valves 37. 38 and 39 are fluid pressure supply pipes connecting respectively the upper and lower ends of cylinder 18 for the purpose of reciprocating its piston 24 and attached rod 25 to elevate or depress the suction head 30, and disk 26 with its coöperating fingers 28, 28, said pipes 38 and 39 being connected to any suitable source of motive fluid pressure, not shown, and a well-known expedient in this class of machines, by means of pipe connections 40 and 41 as shown in Fig. 2. Pipes 42 and 43 connect the lower and upper interior portions of the cylinder 19 with the same source of power and pipes 40 and 41 for the purpose of reciprocating the piston 21 and operating the suction piston 22 to withdraw or exhaust the air through the flexible tubes 36 from within the suction head 30, as will be readily seen. The upper head of the suction cylinder 20 is supplied with an outwardly opening relief or exhaust valve 44, for the purpose of permitting the escape of the air on the upward stroke of piston 22. The usual form of blow head 45 is adjustably supported from the hollow central column 17, and has the interior of its upper and lower ends (see Fig. 2) connected by means of flexible pipes 46 and 47 with the compressed air supply pipes 40 and 41, as indicated. The connection of pipes 38, 39, 42, 43, 46 and 47 with the pressure supply pipes 40 and 41 are controlled respectively, by any suitable form of combined control and relief valves 48, 49, 50, 51, 52 and 53, as indicated in Fig. 2, said valves being controlled by any suitable manual or automatic means common in this class of invention and forming no part of the physical steps of the present process.

The preferred manner of carrying out the process is as follows:

A charge of molten glass is deposited in each of the blank molds 13 and 14 on table 10 and pressed in the usual manner as well understood in this class of machines and needs no further showing and disclosure.

As the pressed hot blanks formed in said molds 13 and 14 reach the point opposite to the interengaging pinion 12, said hot blanks are transferred to the blow molds 15 and 16, the hot blanks of molds 13 going into blow molds 15, and hot blanks of molds 14 being deposited into blow molds 16, which operation is continuous and without appreciable loss of heat in the transferring of the blanks from their respective molds 13 and 14 to blow molds 15 and 16. As the blow molds are carried by the rotation of the table 11 to the point directly in position to be blown by the blow head 45, said blow head is then lowered in proper position and the contained blank is blown up. This operation is repeated as each of the blow molds 15 and 16 reach the blowing position under the blow head 45. The preferred manner of carrying out the process is to first blow one of the blow molds 15 to form an inner section I. The blow head 45 is then elevated and the blow mold 15 with its inner section I completed therein is advanced to the point directly under the suction head 30, and the upper hinged section of the blow mold 15 is then opened while being advanced to position under suction head 30. Said head 30 and rod 25 with its attached spring fingers 28, and disk 26 are depressed so that the lower edge 34 of head 30 rests on the upper open hinged section of the blow mold 15. A further depression of the end of rod 25 causes the disk 26 to be seated in the mouth of and the fingers 28 will engage the outer edge of the ring of the blown inner section I, within the mold 15. The suction head 30 and the rod 25, disk 26 with the fingers 28 carrying the engaged inner section I is then elevated. During this forging operation the following blow mold 16 has been blown under the blow head 45 and is advanced with the blown outer shell O in position under suction head 30. When assured that said blow mold 16 is properly adjusted, the suction head 30 with rod 25, disk 26 and fingers 28 carrying the attached inner section I is lowered to such an extent that the lower edge 34 of the suction head is firmly seated and with a sealing contact rests on the top tapered portion of the mold 16 and the body portion of the inner section I will project into the outer shell O and without touching the said shell O. As soon as the edge 34 of suction head 30 has been sealed against mold 16, the suction pump 20 is operated as will be readily understood, and said exhausting operation by pump 20 is continued until a near approach to a vacuum has been attained within the head 30 and space between the walls of the inner section I and outer shell O, when the piston 24 with its rod 25 is further depressed until the under side of the upper ring portion of the inner section and the top portion of the mouth of the outer shell are in contact and in position, as shown in finished container illustrated in Fig. 7. The glass being hot and in a sticky condition the joint between said inner section I and outer shell O will be hermetically sealed and the vacuum between said section I and shell O be permanently preserved when the completed container is removed from the mold 16. After the sealing operation just described is completed, the valve 35 is opened and air permitted to enter within the head 30, thereby neutralizing the outside or atmospheric pressure. The piston 24, rod 25, disk 26, fingers 28, and head 30 are then elevated, said fingers 28 and disk 26 being easily released from the inner section I and finished container. Said mold 16 with finished container B therein (see Fig. 2) is then advanced to the position indicated, when the mold 16 is opened and the finished container is removed from said mold 16, and set upon a cooling stand to cool, as is the usual practice in manufacturing glass hollow ware, and later to be subjected to annealing or other treatment, if so desired. The foregoing operations as will be seen by the arrangement of apparatus can be made continuously and without interruption and any unnecessary movements.

It will also be seen that by the practice or steps used in carrying out my process, a vacuum wall container is produced without reheating any part or section of the elements forming said container, thereby insuring a uniform product at a minimum of cost, and no appreciable losses due to the breakage owing to repeated handling, and unequal expansion and contraction of the glass. It will also be readily understood that many types of horizontal, as well as vertical types of machinery, can be utilized for carrying out the novel steps of the hereindescribed process whether the inner section or the outer shell is blown first.

What I claim is:—

1. The process of manufacturing vacuum wall containers which consists in, first, forming a hot inner section having a closed bottom and open top end and a hot outer shell having a closed bottom and a top provided with an opening larger in diameter than the greatest width of the body portion of the inner section, second, inserting the body portion of the hot inner section within the hot outer shell, third, exhausting the air between the walls of the outer shell and the body portion of the inner section, fourth, uniting the hot inner portion of the opening of the outer shell and the hot outer portion of the top end of the inner section while said inner and outer portions are in condition to stick and adhere to each other and hermetically seal the space formed between said outer shell and inner section, whereby a vacuum wall container is produced without reheating any portion of the sections forming the container.

2. The process of manufacturing vacuum wall containers which consists in, first, forming a hot inner section having a closed bottom and an open top end, second, forming a hot outer shell having a closed bottom and a top provided with an opening larger in diameter than the greatest width of the body portion of the inner section, third, inserting the body portion of the hot inner section within the hot outer shell, fourth, exhausting the air between the walls of the outer shell and the body portion of the inner section, fifth, uniting the hot inner portion of the open top of the outer shell and the hot outer portion of the open top end of the inner section while said inner and outer portions are in condition to stick and adhere to each other and hermetically seal the space formed between said outer shell and inner section, whereby a vacuum wall container is produced without reheating any portion of the sections forming the container.

3. The process of manufacturing vacuum wall containers which consists in, first, forming a hot inner section having a closed bottom and an open top end, second, forming a hot outer shell having closed bottom and a top provided with an opening larger in diameter than the greatest width of the body portion of the inner section, third, inserting the body portion of the hot inner section within the hot outer shell, fourth, exhausting the air between the wall of the outer shell and the body portion of the inner section, fifth, forcing together the hot inner portion of the open top of the outer shell and the hot outer portion of the open top end of the inner section while said inner and outer portions are in condition to stick and adhere to each other and hermetically seal the space formed between said outer shell and inner section, whereby a vacuum wall container is produced without reheating any portion of the sections forming the container.

4. The process of manufacturing vacuum wall containers which consists in, first, forming an inner section having a closed bottom and a hot open top end and an outer shell having a closed bottom and a hot top provided with an opening larger in diameter than the greatest width of the body portion of the inner section; second, inserting the body portion of the inner section within the outer shell, third, exhausting the air between the walls of the outer shell and the body portion of the inner section; fourth, uniting the hot inner portion of the opening of the outer shell and the hot outer portion of the top end of the inner section while said inner and outer portions are in condition to stick and adhere to each other and hermetically seal the space formed between said outer shell and innner section.

In testimony whereof I affix my signature.

CHARLES A. ROHLAND.